(12) United States Patent
Hsu et al.

(10) Patent No.: US 6,898,074 B2
(45) Date of Patent: May 24, 2005

(54) BUCKLING-UP STRUCTURE FOR BATTERY LID OF ELECTRONIC DEVICE

(75) Inventors: Hsi-Hsing Hsu, TaoYuan (TW); Shih-Chieh Wang, Taipei (TW)

(73) Assignee: High Tech Computer Corp., Tao Yuan (TW)

( * ) Notice: Subject to any disclaimer, the term of this patent is extended or adjusted under 35 U.S.C. 154(b) by 128 days.

(21) Appl. No.: 10/384,698

(22) Filed: Mar. 11, 2003

(65) Prior Publication Data

US 2004/0080916 A1 Apr. 29, 2004

(30) Foreign Application Priority Data

Oct. 25, 2002 (TW) ....................................... 91124913 A

(51) Int. Cl.[7] ................................................. G01F 1/16
(52) U.S. Cl. ...................... 361/679; 361/615; 361/616; 361/683; 429/96; 312/208.1
(58) Field of Search .......................... 363/679, 681–684, 363/601, 615, 616; 429/96–100, 123, 163; 455/90, 351, 575, 347; 439/500, 627; 381/69.2; 340/825.44; 345/168–172, 905; 235/145; 248/917; 312/208.1, 208.4; 400/489, 682, 691–693

(56) References Cited

U.S. PATENT DOCUMENTS

| | | | | |
|---|---|---|---|---|
| 5,722,705 A | * | 3/1998 | Deguchi | 292/87 |
| 5,724,654 A | * | 3/1998 | Yamada et al. | 455/348 |
| 5,882,816 A | * | 3/1999 | Gotou | 429/100 |
| 5,905,632 A | * | 5/1999 | Seto et al. | 361/683 |
| 6,057,055 A | * | 5/2000 | Kumagawa | 429/97 |
| 6,159,632 A | * | 12/2000 | Osawa | 429/100 |
| 6,317,313 B1 | * | 11/2001 | Mosgrove et al. | 361/680 |
| 6,338,914 B1 | * | 1/2002 | Schuurmans | 429/97 |
| 6,479,184 B1 | * | 11/2002 | Shiue | 429/123 |
| 6,625,425 B1 | * | 9/2003 | Hughes et al. | 455/90.3 |
| 6,712,643 B2 | * | 3/2004 | Suzuki | 439/500 |
| 6,730,432 B1 | * | 5/2004 | Grosfeld et al. | 429/97 |

* cited by examiner

*Primary Examiner*—Michael Datskovsky
(74) *Attorney, Agent, or Firm*—Troxell Law Office, PLLC

(57) ABSTRACT

A buckling-up structure for latching a battery lid (3) to a casing (2) of a PDA is disclosed. The battery lid (3) is used for covering a battery accommodation groove (5). The structure comprises a latching lock (9) forming a plurality of wedging hooks (94) thereon, a plurality of wedging hooks (32, 34) on two sides of the battery lid (3), respectively. An elastic body (8) is used to exert a pushing force to the latching lock. An operation button (7) is secured to the latching lock, whereby when the operation button is moved the latching lock and the elastic body move correspondingly. When the battery lid is locked to the casing, the wedging hooks (32) engage in recessing holes (52) of the casing, and the wedging hooks (34) engage with the wedging hooks (94). To release the lock between the battery lid and the casing, the operation button is motivate to move the latching lock whereby the engagement between the wedging hooks (34) and the wedging hooks (94) is released; thus, the battery lid can be removed from the casing. A stylus accommodation groove (6) is formed in the casing between the battery accommodation groove and latching lock.

16 Claims, 4 Drawing Sheets

BUCKLING-UP STRUCTURE FOR BATTERY LID OF ELECTRONIC DEVICE

FIELD OF THE INVENTION

The invention relates to a buckling-up structure for a battery lid, and particularly to a buckling-up structure for a battery lid of a personal digital assistant (PDA) or other hand-held electronic devices.

BACKGROUND OF THE INVENTION

Accordingly, the development of electronic industry is extremely fast, wherein 3C electronic products, including: computer, communication product, and consumer electronic product, etc., are particularly the leading ones among them, and its convenience brought to our daily lives has make modern people unable to live without 3C product, while the marketing mechanism, aiming to satisfy the requirements of different consumers, has developed many products with different functions, prices, and sizes to provide consumer with different choices; for example, the desktop computer (PC) that is commonly used in home or job may be applied for data processing, drawing, or internet but, when the user is going to work in the outside, it is impossible to carry the heavy desktop computer with the people, so the user will consider to purchase a notebook as his working instrument, but the user also has to bear the shortcomings brought by the notebook computer: its price is higher than that of desktop computer, the sustaining ability of its battery is poor, and its operation and accessory's upgrade are uneasy; furthermore, someone still criticizes a notebook computer being too heavy, so the hand-held electronic device such as personal digital assistant (PDA) is subsequently given birth and, since its computer structure is simplified and has simpler operation system (e.g., two large OS camps: Palm, Win CE), so the user may utilize the functions of easy online, paper processing, and recording personal data, etc., and it is characterized with small size, light weight (able to be put in the upper pocket), and cheaper price, so it is deeply favored by specific technical group, and its fashion rolling up the entire market may be observed by all of us. The present invention is a further improvement aiming for the structure of the personal digital assistant, such that the product may reach an objective of convenience of humanity usage.

Currently, most of the PDA adopts Li-ion battery as power source; please refer to FIG. 1, which shows a conventional PDA 10, which uses a Li-ion battery 13, of which combination structure is mainly to arrange a battery accommodation groove 11 on one side surface (usually the bottom surface) of the hand-held PDA 10, such that the Li-ion battery 13 may be accommodated in the accommodation groove 11, above which a bottom lid 14 covers. The bottom lid 14 has a tenon 15 arranged at a front end thereof. The tenon 15 is used to be wedged into a recessing hole 16 of the accommodation groove 11 so that the bottom lid 14 can be securely mounted to the PDA 10 and cover the accommodation groove 11 after the Li-ion battery 13 is received in the accommodation groove 11. The Li-ion battery 13 is made an electric connection with the electric pin 12 within the accommodation groove 11, such that the power of the battery 13 can be supplied to the PDA 10.

However, the conventional PDA 10 has a shortcoming regarding the bottom lid 14 that the interconnection structure between the tenon 15 and the recessing hole 16 can sometimes be difficult to release, so that the bottom lid 14 cannot be readily removed from the PDA. This is particularly annoying when a user of the PDA 10 needs to open the bottom lid 14 to replace the battery 13. Furthermore, after a repeated use, the tenon 15 may be worn, so that it can not lock within the recessing hole 16. When this happens, the bottom lid 14 may no longer be used to cover the accommodation groove 11 and the battery 13.

In addition, since most of the current PDA 10 applies a touch panel as the interface for imputing data, there is a long narrow tube groove 17 arranged along one side of almost every PDA for accommodating a stylus 18. For all the conventional hand-held PDA sold in current market, the long narrow tube groove 17 and the battery accommodation groove 11 are positioned separately on different sides of the hand-held PDA, which is uneconomic regarding the utilization of the valuable space of the PDA, since the PDA requires a very compact design to facilitate miniaturization.

SUMMARY OF THE INVENTION

A main objective of the invention is to provide a PDA with a battery lid which can be reliably secured to the PDA to cover a battery received in a battery accommodation groove, and which can be easily removed from the PDA when a user of the PDA needs to replace the battery.

Another objective of the invention is to provide a PDA wherein a space of the PDA can be optimally utilized by arranging a stylus receiving groove between a latching lock and a battery accommodation groove of the PDA.

To achieve above objectives, a buckling-up structure for a battery lid of a PDA is comprised of a casing, a battery lid, a latching lock and an elastic body The casing defines a battery accommodation groove for receiving a battery therein. The battery lid is used to be mounted to the casing to cover the battery accommodation groove; the latching lock is arranged on the casing by a glideable manner for being buckled up with wedging hooks arranged on a side of the battery lid; a stylus accommodation groove is arranged between the battery accommodation groove and the latching lock for accommodating a stylus; the elastic body is arranged on the casing for exerting a pushing force to the latching lock thereby maintaining a buckling-up state between the latching lock and the wedging hooks of the battery lid; the latching lock is glided by applying a force thereto such that the interlock between the latching lock and the battery lid is released. The elastic body is deformed by the force. An operation button is connected to the latching lock so that the force for causing the latching lock to slide can be exerted thereto by a user of the PDA by manipulating the operation button.

DETAILED DESCRIPTION OF THE INVENTION

Figure 1:
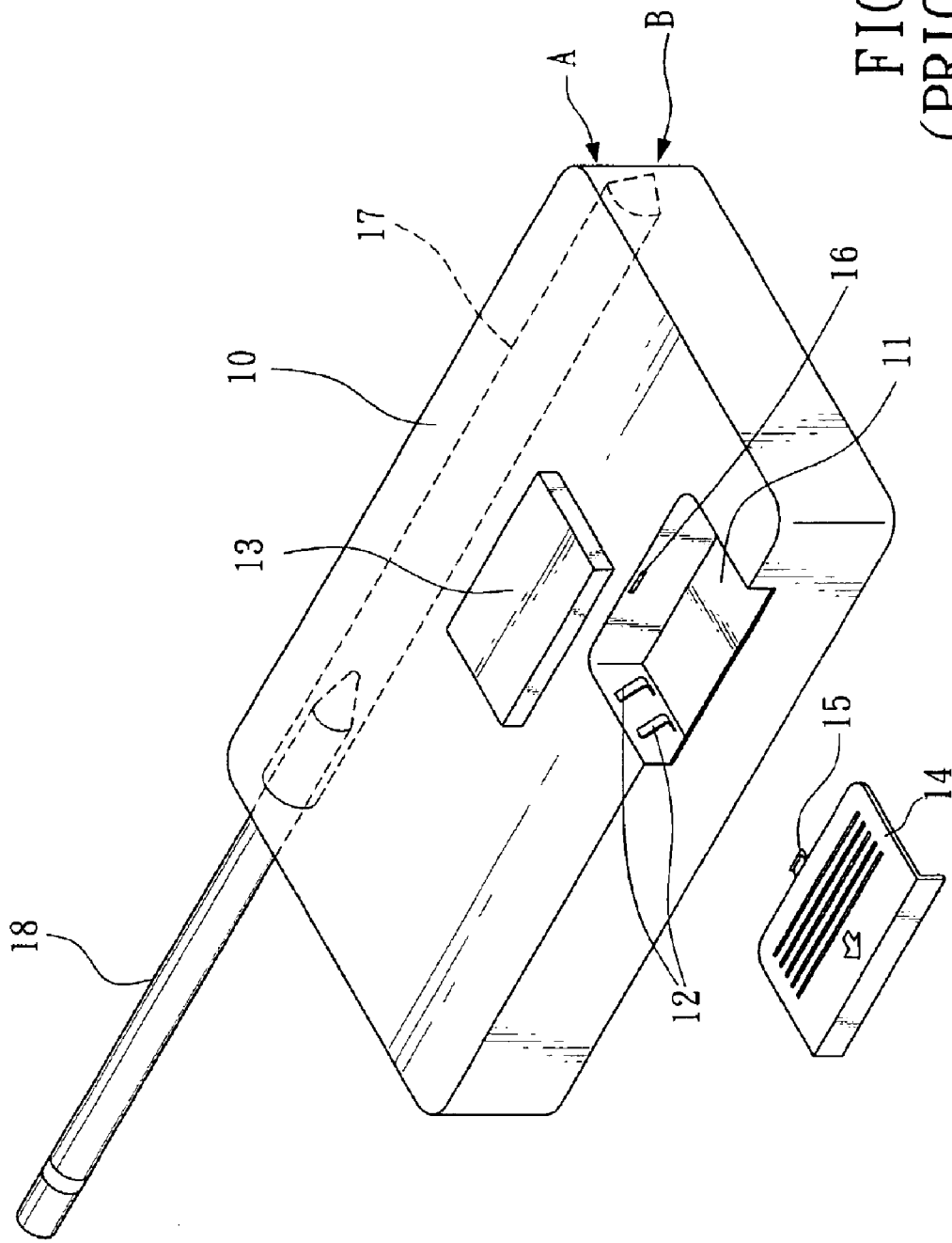
FIG. 1 is a conventional PDA.
Figure 2:
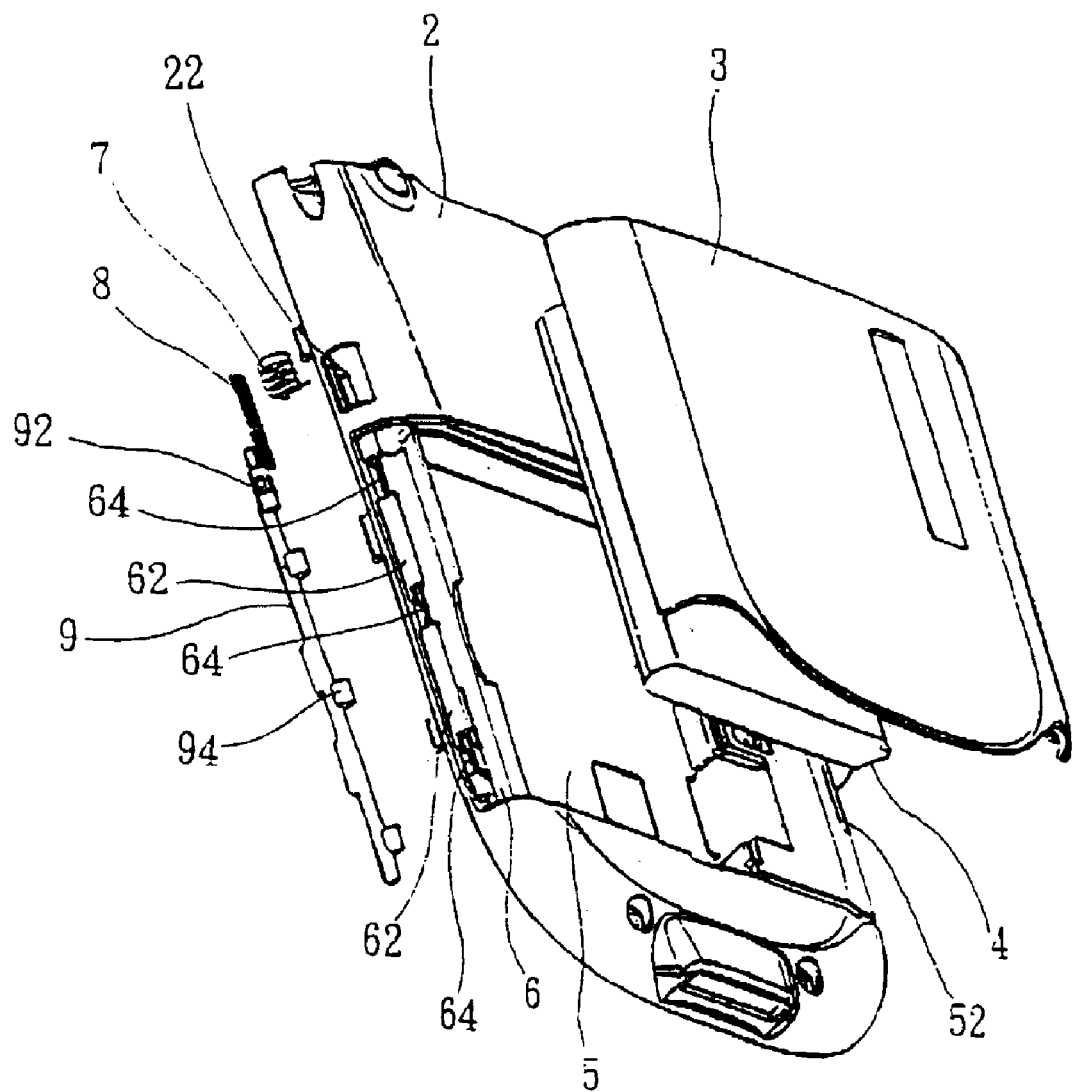
FIG. 2 is an exploded view of a PDA according to the invention.
Figure 3A:
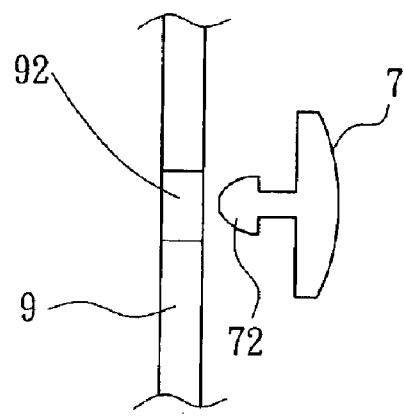
FIG. 3A is a diagrammatic view showing a relationship between a latching lock and an operation button of the PDA of FIG. 2.
Figure 3B:
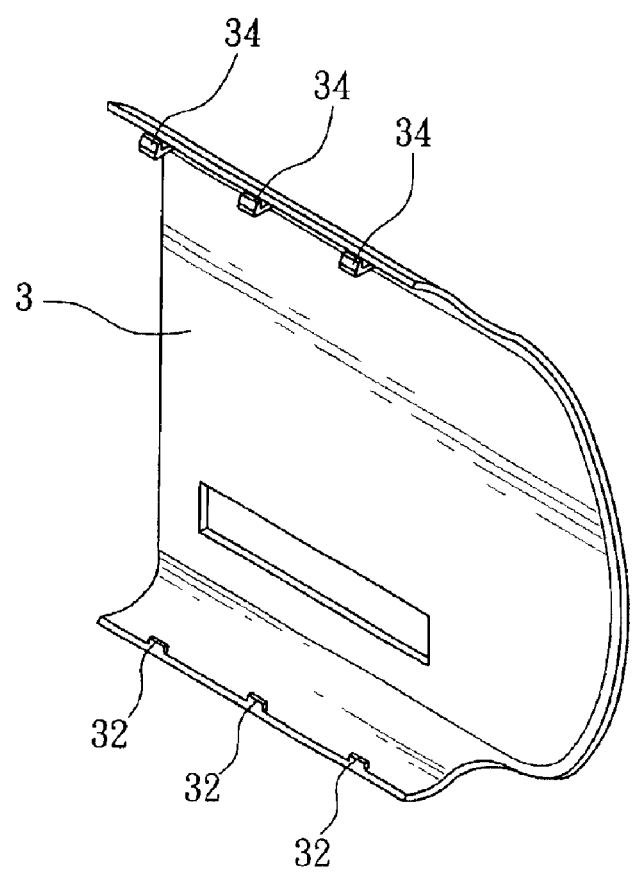
FIG. 3B is a perspective view of a battery lid of the PDA of FIG. 2, from a different aspect.

Referring to FIGS. 2 and 3B, the invention is a battery lid's buckling-up structure, which sufficiently utilizes the internal space of a hand-held electronic device such as a PDA, wherein a latching lock 9 capable of moving in horizontal direction is arranged at a side edge of a stylus accommodation groove 6 beside a battery accommodation groove 5. An operation button 7 is connected to the latching lock 9, such that when the operation button 7 is pushed to move, the latching lock 9 moves correspondingly. A battery lid 3 is used to be mounted to a casing 2 of the PDA and covers the battery accommodation groove 5. The battery lid 3 forms wedging hooks 32, 34 at two opposite sides thereof, wherein the wedging hooks 32 at one side thereof engage in recessing holes 52 of the casing 2 and the wedging hooks 34 at the other side of the casing 2 engage with wedging hooks 94 of the latching lock 9 so that the battery lid 3 is secured to the casing 2. When the latching lock 9 is moved by manipulating the operation button 7, the engagement between the latching lock 9 and the battery lid 3 is released; thus, the battery lid 3 can be easily removed from the PDA whereby a battery 4 placed in the battery accommodation groove 5 can be removed therefrom and replaced by a new battery.

Please refer to FIG. 2, which is an exploded view of the PDA according to the invention, wherein the battery accommodation groove 5 is arranged at a back of the casing 2 of the PDA. The battery accommodation groove 5 is used for receiving the battery 4 therein. The battery 4 can electrically connect with an electrical connector (not shown) in the battery accommodation groove 5 so as to supply electrical power to the PDA. The recessing holes 52 are arranged on one side of casing 2 beside the battery accommodation groove 5. Please also refer to FIG. 3A, which shows an inside structure of the battery lid 3 of the PDA, wherein the wedging hooks 32, 34 are provided at two sides of the battery lid 3, respectively. The wedging hooks 32 are used to engage in the recessing holes 52 of the casing 2.

Figure 4:
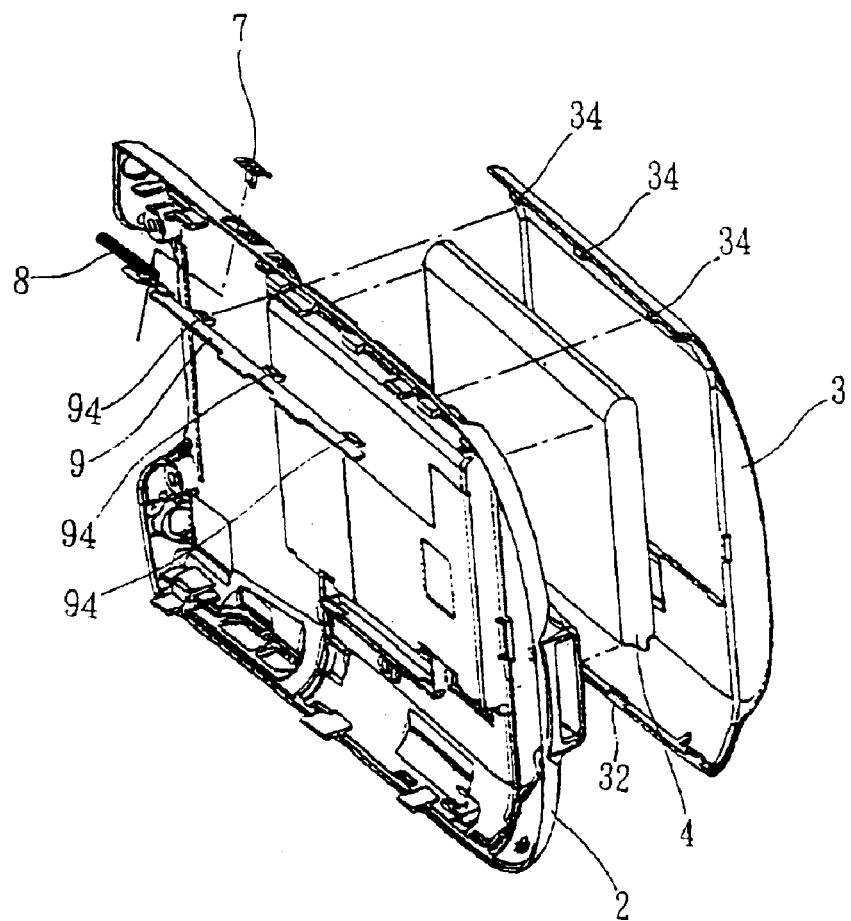
FIG. 4 is a view similar to FIG. 2, from a different aspect.
Figure 5:
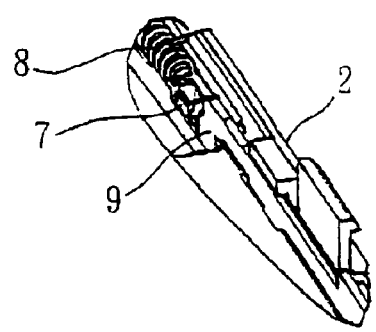
FIG. 5 is an enlarged view showing a portion of a combination of the operation button, an elastic body, a casing and the latching lock of the PDA according to the invention.

Furthermore, a stylus accommodation groove 6 is arranged beside the battery accommodation groove 5, and the stylus accommodation groove 6 is capable of accommodating a stylus (not shown in the figures) of the PDA. A plurality of flanges 62 is arranged beside the stylus accommodation groove 6, and the flanges 62 are capable of enhancing the fixation of the stylus in the groove 6. An action hole 64 is arranged between two neighboring flanges 62; in the meantime, please refer to FIG. 4 and FIG. 5, which show that a back of the plural flanges 62 and the action holes 64 is used for accommodating the latching lock 9, which is shown as a structure of long narrow stripe or long narrow piece and forms thereon the wedging hooks 94. A spacing distance between two neighboring wedging hooks 94 is corresponding to that between two neighboring action holes 64, such that the wedging hooks 94 are accommodated in the holes 64, respectively. The wedging hooks 94 are movably received in the action holes 64, respectively. An elastic body 8 is further arranged to have one end connecting with the latching lock 9, and another end abutting against an inside of the casing 2 whereby the elastic body 8 can provide a pushing force to the latching lock 9. The elastic body 8 in this embodiment is a compression spring. When the elastic body 8 and the latching lock 9 are mounted to the casing 2, an operation button 7 is mounted to the casing 2. The operation button 7 has a buckle 72 extending through a penetration hole 22 of the casing 2 and fixedly engaging with the latching lock 9 at a position near the elastic body 8; in the meantime, please refer to FIG. 3B, which shows that the buckle 72 of the operation button 7 is used to engage in a corresponding buckling hole 92 on the latching lock 9 to thereby fasten the operation button 7 to the latching lock 9.

When the battery lid 3 of the invention is intended to buckle up with the casing 2 and cover the battery accommodation groove 5 and the stylus accommodation groove 6, the wedging hooks 32 of the battery lid 3 are firstly brought to engage into the recessing holes 52 at one side the battery accommodation groove 5 for implementing the fixation of a single side of the battery lid 3; then, the wedging hooks 34 of the battery lid 3 are brought to buckle up with the wedging hooks 94 of the latching lock 9 at another side of the battery accommodation groove 5, in which the sizes of the wedging hooks 94 and the wedging hooks 34 are generally the same. Thus, the battery lid 3 is reliably and securely mounted to the casing 2. When it is necessary to remove the battery lid 3 from the casing 2 in order to replace the battery 4, a user of the PDA only needs to push the operation button 7 horizontally to motivate the latching lock 9 and the elastic body 8 to move rearwards, whereby the wedging hooks 94 of the latching lock 9 are completely separated from the corresponding wedging hooks 34 of the battery lid 3. Thus, the latching between the battery lid 3 and the casing 2 achieved by the engagement between the wedging hooks 32 of the battery lid 3 and the wedging hooks 94 of the latching lock 9 is released, and the battery lid 3 can be removed from the casing 2 readily. Thus, the battery 4 received in the battery accommodating groove 5 can be replaced with a new one.

What is claimed is:

1. A buckling-up structure for a battery lid of an electronic device, comprising:

a casing defining a battery accommodation groove therein;

a battery lid mounted on the casing and covering the battery accommodating groove;

a latching lock slidably mounted on the casing and buckling up with the battery lid;

an elastic body arranged on the casing and exerting a force to the latching lock along a first direction to keep the latching lock in a buckling-up state with the battery lid;

wherein, by applying force to the elastic body along a second direction opposite the first direction, the latching lock is glided and the lock between the latching lock and the battery lid is released, wherein a second cavity is arranaed in the casing between the accommodation groove and the latching lock, wherein the second cavity is used for accommodating a stylus and the battery lid also covers the second cavity.

2. The buckling-up structure according to claim 1, wherein the latching lock comprises a first wedging hook, and the battery lid comprises a second wedging hook, and the first wedging hook engages the second wedging hook.

3. The buckling-up structure according to claim 2, wherein the second cavity further comprises an action hole for accommodating the first wedging hook.

4. The buckling-up structure according to claim 1 further comprising an operation button slidably mounted on the casing and connecting with the latching lock, said operation button being adapted for receiving a force thereby exerting the force along the second direction to the latching lock.

5. The buckling-up structure according to claim 4, wherein the operation button is secured to the latching lock at a location near the elastic body.

6. The buckling-up structure according to claim 1, wherein a recessing hole is arranged in the casing, and the battery lid is further provided with a third wedging hook engaging in the recessing hole.

7. A buckling-up structure for a battery lid of an electronic device, comprising:

a casing defining a battery accommodation groove for receiving a battery therein and a stylus accommodation groove for receiving a stylus therein;

a latching lock slidably mounted on the casing, wherein the stylus accommodation groove is located between the battery accommodation groove and the latching lock;

a battery lid mounted to the casing, covering the battery accommodation groove and the stylus accommodation groove and buckling up with the latching lock; and a compression spring arranged on the casing for exert a force to the latching lock to maintain the buckling-up state between the latching lock and the battery lid;

wherein, by applying a force to compress the compression spring, the latching lock is glided, and the buckling-up state between the latching lock and the battery lid is released.

8. The buckling-up structure according to claim 7, wherein the latching lock is arranged with a first wedging hook, and the battery lid is arranged with a second wedging hook, the first wedging hook engaging with the second wedging hook when the battery lid buckles up with the latching lock.

9. The buckling-up according to claim 8, wherein the stylus accommodation groove is further arranged with an action hole accommodating the first wedging hook.

10. The buckling-up according to claim 9 further comprising an operation button connected with the latching lock, the force to compress the compression spring being applied by manipulating the operation button.

11. The buckling-up according to claim 10, wherein the operation button includes a buckle, and the latching lock includes a hole, the buckle engaging in the hole.

12. The buckling-up according to claim 11, wherein a recessing hole is arranged in the casing, and the battery lid is further provided with a third wedging hook engaging in the recessing hole.

13. A personal digital assistant (PDA), comprising:

a casing defining a first groove for receiving therein a battery for supplying electrical power to the PDA;

a battery lid mounted to the casing and covering the first groove;

a latching lock slidably mounted on the casing between first and second positions, wherein at the first position, the latching lock buckling up the lid and at the second position, the buckling up between the latching lock and the lid at the first position of the latching lock is released; and an elastic body exerting a force to the latching lock for maintaining the latching lock to buckle up with the lid, wherein the casing defines a second groove between the first groove and the latching lock adapted for accommodating a stylus.

14. The PDA according to claim 13 further comprising an operation button slideably mounted on the casing and connecting with the latching lock, adapted for receiving an external force for forcing the latching lock to move to the second position.

15. The PDA according to claim 14, wherein the battery lid forms a plurality of wedging hooks at two sides thereof, wherein the wedging hooks at one side engage in recessing holes of the casing, and the wedging hooks at the other side engage with the latching lock when the latching lock is located at the first position.

16. The PDA according to claim 15, wherein the casing forms a plurality of flanges beside the second groove, a plurality of holes between the flanges, the latching lock having a plurality of wedging hooks received in the holes between the flanges, respectively, and engaging with the wedging hooks of the lid at the other side thereof when the latching lock is located at the first position.

* * * * *